(12) United States Patent
DiLullo et al.

(10) Patent No.: US 6,767,869 B2
(45) Date of Patent: Jul. 27, 2004

(54) WELL SERVICE FLUID AND METHOD OF MAKING AND USING THE SAME

(75) Inventors: Gino F. DiLullo, Rio de Janeiro (BR); Philip J. Rae, Singapore (SG); Atikah J. K. Ahmad, Singapore (SG)

(73) Assignee: BJ Services Company, Houston, TX (US)

( * ) Notice: Subject to any disclaimer, the term of this patent is extended or adjusted under 35 U.S.C. 154(b) by 119 days.

(21) Appl. No.: 10/118,737

(22) Filed: Apr. 9, 2002

(65) Prior Publication Data

US 2002/0189810 A1 Dec. 19, 2002

Related U.S. Application Data

(63) Continuation-in-part of application No. 09/783,451, filed on Feb. 14, 2001, now Pat. No. 6,491,099.
(60) Provisional application No. 60/282,732, filed on Apr. 10, 2001, and provisional application No. 60/185,774, filed on Feb. 29, 2000.

(51) Int. Cl.$^7$ ............................. C09K 3/00; E21B 43/26
(52) U.S. Cl. ..................... 507/244; 507/213; 507/221; 507/222; 507/224; 507/225; 507/226; 507/922
(58) Field of Search ................................ 507/244, 213, 507/221, 222, 224, 225, 226, 922; 166/308

(56) References Cited

U.S. PATENT DOCUMENTS

| | | | |
|---|---|---|---|
| 4,476,931 A | 10/1984 | Boles et al. ............... 166/294 |
| 4,796,702 A | 1/1989 | Scherubel ................... 166/308 |
| 4,806,256 A | 2/1989 | Rose et al. .................... 252/71 |
| 5,258,137 A * | 11/1993 | Bonekamp et al. ........... 516/11 |
| 5,551,516 A | 9/1996 | Norman et al. ............. 166/308 |
| 5,964,295 A | 10/1999 | Brown et al. ............... 166/308 |
| 6,194,356 B1 | 2/2001 | Jones et al. .................. 507/225 |
| 6,258,859 B1 | 7/2001 | Dahayanake et al. |
| 6,306,800 B1 * | 10/2001 | Samuel et al. .............. 507/129 |
| 6,410,489 B1 * | 6/2002 | Zhang et al. ................ 507/202 |
| 6,412,561 B1 * | 7/2002 | Brown et al. ............... 166/308 |
| 6,468,945 B1 * | 10/2002 | Zhang ........................ 507/240 |
| 6,491,099 B1 * | 12/2002 | Di Lullo Arias et al. ... 166/300 |
| 6,605,570 B2 * | 8/2003 | Miller et al. ................ 507/211 |
| 2002/0169085 A1 * | 11/2002 | Miller et al. ................ 507/200 |
| 2003/0073585 A1 * | 4/2003 | Di Lullo Arias et al. ... 507/129 |

FOREIGN PATENT DOCUMENTS

| | | | |
|---|---|---|---|
| WO | WO 90/14403 | 11/1990 | ............ C09K/7/02 |
| WO | WO 98/56497 | 12/1998 | ........... B01F/17/00 |
| WO | WO 01/51767 A2 | 7/2001 | ........... E21B/43/26 |
| WO | WO 01/77478 A2 | 10/2001 | |

OTHER PUBLICATIONS

"Fracturing Fluids and Breaker Systems—A Review of the State-of-the-Art" SPE International 37359 Phil Rae, SPE and Gino di Lullo, SPE, BJ Services Company.

"Toward Zero Damage: New Fluid Points the Way" SPE International 69453 (2001), Phil Rae, SPE and Gino di Lullo, SPE, BJ Services Company.

* cited by examiner

Primary Examiner—Philip C. Tucker
(74) Attorney, Agent, or Firm—Howrey Simon Arnold & White (57) ABSTRACT

A well fracturing fluid comprising one or more anionic viscoelastic surfactants and one or more polymers is described. The fluids can contain an aqueous or non-aqueous fluid and/or buffer for adjusting the pH of the fracturing fluid. The well service fluid can used as a fracturing fluid in order to control water production from a well, while simultaneously increasing the oil production from the well.

28 Claims, 5 Drawing Sheets

| Rheology of MA-1 with $KH_2PO_4$ | | | | | | |
|---|---|---|---|---|---|---|
| Time (min) | Temp | n' | k'(lb s$^{n}$/ft$^2$) | Effective viscosity | | |
| | | | | 170/s (cp) | 100/s (cp) | 40/s (cp) |
| 3 | 71 °F (22 °C) | 0.108 | 0.3229 | 159 | 255 | 577 |
| 24 | 156 °F (69 °C) | 0.007 | 0.5411 | 158 | 268 | 665 |
| 35 | 178 °F (81 °C) | 0.091 | 0.3443 | 155 | 251 | 577 |
| 79 | 210 °F (99 °C) | 0.002 | 0.5180 | 148 | 251 | 626 |
| 101 | 214 °F (101 °C) | 0.002 | 0.5190 | 148 | 251 | 627 |
| 112 | 215 °F (102 °C) | 0.003 | 0.5184 | 148 | 251 | 627 |

Effect of Aquatrol C in ElastraFrac

Pressure: 250 psi
Temperature;
Volume Used:

Temperature: 150F
Core K: 500 mD 350 ml

| ElastraFrac 3.5 | | ElastraFrac 3.5 _ 8% Aquatrol C | | SQRoot Time |
|---|---|---|---|---|
| Time (Min.) | Volume (cc) | Time (Min.) | Volume (cc) | |
| 0.5 | 70 | 0.5 | 44 | 0.71 |
| 1 | 130 | 1 | 100 | 1.00 |
| 2 | 210 | 2 | 167 | 1.41 |
| 3 | 348 | 3 | 195 | 1.73 |
| 4 | | 4 | 198 | 2.00 |
| 5 | | 5 | 200 | 2.24 |
| 7.5 | | 7.5 | 205 | 2.74 |
| 10 | | 10 | 207 | 3.16 |
| 15 | | 15 | 210 | 3.87 |
| 20 | | 20 | 211 | 4.47 |
| 25 | | 25 | 212 | 5.00 |
| 30 | | 30 | 214 | 5.48 |
| Visc.Pre.Filtering | 720 a 40 s-1 | | 655 a 40 s-1 | |
| Visc Post Filtering.: | 680 a 40 s-1 | | 643 a 40 s-1 | |
| Cw =0.0164 *m/Ac, ft/min^0.5 | 0.1041 | | 0.0024 | |
| Leak-Off Viscosity cps | 150 | | 148 | |

FIGURE 5

| Fluid | Core 1- Water Saturated Permeability | Core 2- Oil Saturated Permeability |
|---|---|---|
| Initial Water Permeability | 14.01 | - |
| Initial Oil Permeability | - | 11.14 |
| Treatment with M-Aquatrol | - | - |
| Final Water Permeability | 3.57 | 0.18 |
| Final Oil Permeability | 11.28 | 7.64 |
| Rw – Restriction factor to water | 3.92 | 77 |
| Ro – Restriction factor to oil | 1.25 | 1.45 |

WELL SERVICE FLUID AND METHOD OF MAKING AND USING THE SAME

CROSS-REFERENCE TO RELATED APPLICATIONS

The present application is a Continuation-in-Part of U.S. patent application Ser. No. 09/783,451, filed Feb. 14, 2001, now U.S. Pat. No. 6,491,099 which was a non-provisional of U. S. Provisional Patent Application Serial No. 60/185,774, filed Feb. 29, 2000. The present application also claims priority to U.S. Provisional Patent Application Serial No. 60/282,732 filed Apr. 10, 2001.

FIELD OF THE INVENTION

The present invention relates to a sandstone water wetting viscoelastic surfactant and polymer based composition for well fracturing fluids. More specifically, it relates to a viscoelastic anionic surfactant in combination with relative permeability modifier polymer based compositions for selectively increasing hydrocarbon production (oil and or gas) while simultaneously maintaining or reducing the flow of subterranean aqueous fluids into a well, thereby improving hydrocarbon production efficiency.

BACKGROUND OF THE INVENTION

Various types of wellbore fluids are used in operations related to the development, completion, and production of natural hydrocarbon reservoirs. The operations include fracturing subterranean formations, modifying the permeability of subterranean formations, or sand control. Of particular interest with regard to the present inventions are fluids that could be used simultaneously for fracturing and controlling water applications during the life cycle of a hydrocarbon well, e.g., a well for extracting oil or natural gas from the Earth, wherein the producing well commonly also yields water. In these instances, the amount of water produced from the well tends to increase over time with a concomitant reduction of hydrocarbon production. Frequently, the production of water becomes so profuse that remedial measures have to be taken to decrease the water/hydrocarbon production ratio. As a final consequence of the increasing water production, the well has to be abandoned. If the formations are hydraulically fractured with the objective of increasing oil recovery, water production will also be increased, further reducing the productive life of the well.

The chemicals that can be used to modify the permeability of subterranean reservoirs, and hence the undesirable water production, must preferentially be easily pumped (i.e. have a low viscosity) so that they may be easily placed into the reservoir sufficiently far from the wellbore so as to be effective. It is also desirable for the chemicals or mixtures to reduce the permeability of the reservoir to flooding fluids (water) while simultaneously retaining most of the hydrocarbon permeability. Additionally, their placement should be selective in that they are placed into and reduce the permeability of flooding or driving fluids (water) without significantly affecting the less permeable strata. Numerous attempts at resolving these issues have been attempted over the years.

In many cases, a principal component of well water control fluids have been gelling compositions, usually based on polymers or cross-linked polymers. Water control fluids must selectively stop water production without detrimental effects to the oil production. Initially the preferred materials for this purpose were relative permeability modifiers (RPMS) such as polyacrylamide solutions. These polymers have long molecular chains that, after being injected, adhere loosely to the pore spaces, producing a drag on water production (resist water flow) without detrimental effects to the hydrocarbon (oil or gas) production. Unfortunately, these same compounds alone are shear sensitive and have their molecular weight (length of the chain) reduced when sheared, significantly affecting their ability to control/reduce water flow.

New generations of RPM materials have been developed that are less sensitive to shear and contain charged sites that could be adsorbed to the rock so that they remain in place for longer periods of time. These compounds are capable of reducing the relative permeability to water by 2 to 100 fold, depending on the differential pressure. However, for them to anchor properly to the rock these new RPM materials must be water wet and free of oil residues, owing to the fact that these fluids usually incorporate in their formulation a mutual solvent and water-wetting surfactants or detergents. Unfortunately, these compounds also are poor at controlling water in a fracture in heavy oil or asphaltenic crudes with deposits.

In attempting to improve water control down the wellbore and in the reservoir, it is important to understand the effects water has on the surrounding fluids. Water production is directly proportional to the mobility ratio of the formation fluids and therefore to their viscosities and relative permeability. Water at downhole conditions will have a viscosity ranging from 0.2 cps to 1 cps, depending on the well temperature. On the other hand, oil is encountered around the world with viscosities that could be as high as 5000 cps. Consequently, whenever the oil/water viscosity ratio is higher than 10, these RPM solutions become ineffective. In order to overcome this situation and improve water control, higher gel strengths have been suggested and pore blocking systems were developed (such as delayed cross-linked polymer solutions). However, these compounds have low viscosity while being pumped and develop high viscosity 3-dimensional gels over time.

Such pore-blocking systems could also preferentially block the oil-producing zone so they could not be used in fracturing treatments, therefore, to overcome this potential problem, rely on selective placement within the pore system for successfully blocking only the water production. This has been attempted at matrix rates (radial injection) by either mechanical methods when the water zone is known, or by reducing the viscosity of these fluids to water viscosity (very low polymer concentration) making the gel almost transparent to water so it can preferentially follow the water production paths in the reservoir instead of oil paths. Moreover, to achieve this and simultaneously obtain deep penetration into the reservoir, the fluids are pumped at very low injections rates (meaning that these treatments could last several days or even weeks). Unfortunately, sandstone formations are extremely heterogeneous, allowing these fluids to easily invade the oil-producing zone, blocking the pores with overall detrimental effects to oil or other hydrocarbon production.

Gels which are formed by polyacrylamide (U.S. Pat. No. 3,490,533) or polysaccharides (U.S. Pat. Nos. 3,581,524; 3,908,760; 4,048,079) with cations have been used as permeability modifiers for subterranean reservoirs. However, their application has been limited to reservoirs with low ambient temperature (less than 70° C.). Modifications of these compounds, such as sulfomethylated melamine gels (U.S. Pat. No. 4,772,641) have been made, but fail to address all of the needs of an effective well fracturing fluid.

Additionally, numerous difficulties have been encountered with the use of such gel-forming chemicals, such as premature gel formation with concomitant plugging of the reservoir strata near the wellbore; decomposition of polyacrylamides and/or polysaccharides at elevated temperatures leading to destruction of gel character and loss of any permeability modifying attributes; and, over cross-linking and syneresis of the gel at elevated temperatures, thereby reducing the effectiveness of the gel as a permeability modifier.

Recently, the use of cross-linked gels that suffer controlled syneresis (gel contraction with extrusion of water) that partially unblock some of the pores spaces has been attempted. However, this effect happens in both water and oil pores, thereby eliminating any water control effect.

More recently, cationic viscoelastic surfactants such as N-erucyl-N,N-bis (2-hydroxyethyl)-N-methylammonium chloride (which exhibits oil wetting tendency in sandstones) have been frequently documented for application as an aid in water control in well fracturing fluids. This surfactant and similar surfactants are identified in U.S. Pat. Nos. 4,695,389, 4,725,372, 5,551,516, 5,964,295, and 6,194,356 B1. Unfortunately being cationic and oil wetting, some of the benefits are lost as detailed earlier.

In many cases, a principal component of wellbore fracturing fluids are gelling compositions, usually based on polymers and more recently on viscoelastic surfactants. The complete development of fracturing fluid and required properties are fully explained in SPE 37359 (Rae, P.; Di Lullo, G., "Fracturing Fluids and Breaker Systems: A Review of the State of the Art", *Soc. Pet. Engin.*, 37359, 1996).

The three dimensional gels produced by viscoelastic surfactants are preferred as well fracturing fluids when compared with other polymer linear or cross-linked gels even though they are more expensive because of their ability to support/transport solids at low viscosities and because they break cleanly (their viscosity reverts to that of water) in the presence of hydrocarbons, thus producing little or no damage to the sand pack (proppant pack) and to the formation rock, thereby yielding higher well production rates.

The viscoelasticity of the surfactant solutions appears and forms rapidly on mixing the various components which are usually mixed and proportioned continuously during the fracturing process. However, being shear thinning fluids they can be easily placed down the well. Viscoelastic gels are solid/polymer free fluids, and therefore their filtration into the formation matrix during the fracturing process is strictly dependent on the fluid leak-off viscosity. Fracturing fluids (irrespective of their chemistry) whose leak-off is controlled by viscosity, are less efficient than wall-building fluids, being at least one order of magnitude (10 times) worse than polymer based gels (which act to control their filtration process through polymer filter "cake" at the formation face). Thus, viscoelastic gels are relatively inefficient fracturing fluids and their use is limited to small and medium size fracture treatments. This could be overcome by the addition of solids or fluid loss control additives but with detrimental damaging effects to the sand/proppant pack. Another option could be the use of higher surfactant concentration to generate higher viscosities than those required to transport the sand/proppants at surface conditions, but this approach make the fluids very expensive and also surface handling or placement more difficult, especially when fluids are batch mixed. If this approach is acceptable, any application of viscoelastic surfactant gels that requires their transport or placement after their preparation would benefit from a method of controlling their viscosities, filtration properties, and gel times.

In addition to the reduced damage to the sand pack and to the rock, another possible benefit of using viscoelastic gels is controlling water production. Viscoelastic gels do not break easily in the presence of water, therefore any gel that infiltrated a water zone will maintain its viscoelastic properties, and being a shear thinning fluid under static conditions, will develop extremely high viscosities (over 10000 cps) that will block the pores and prevent water flow. However, another important factor in controlling water and hydrocarbon flow through a porous media is the wettability of the rock. Sandstone formation needs to be water wet for higher hydrocarbon flow, as oil wet sandstone rocks favor water flow. Cationic surfactants usually oil wet sandstone so the benefit obtained from blocking water in the water saturated pores are partly overcome by favoring water flow in the recently oil wet pores. Because viscoelastic surfactant properties/viscosity are affected by other chemicals (glycols, alcohols, mutual solvents and other surfactants but not limited to these families) it is quite difficult to overcome this detrimental oil wetting effect.

Thus, it can be seen that there is a need for improved compositions for wellbore water controlling fluids, especially fracturing fluids based on water wetting viscoelastic surfactants due to their higher hydrocarbon production potential (reduced formation damage) and to their potential water control properties. Moreover, it is desirable to reduce the viscoelastic gel filtration process of such compositions by either in-situ viscosity generation, or by the addition of water control chemicals or polymers that do not affect the viscoelastic properties of the gel and the rock oil relative permeability such as an RPM type material, in order to reduce the cost and allow for its application in bigger treatments. Providing such compositions with high and long lasting viscosity in the water-saturated pores and with water wetting properties in order to reduce water flow improves the oil/water ratio, and ultimately hydrocarbon (oil/gas) recovery, after fracturing operations within the hydrocarbon wells.

SUMMARY OF THE INVENTION

The invention relates to the synergistic effect obtained by a combination of anionic surfactant gels and amphoteric polymeric materials to be used as non-damnaging fracturing fluids with long lasting water control properties.

An embodiment of the present invention is a viscous fluid which is particularly useful in transporting particulate through a conduit. The viscous fluid of the invention has application for conventional well fracturing, coiled tubing fracturing, and frac packing, concurrently with water control.

Another aspect of this invention, as described, is the use of amphoteric polymeric materials, typically RPMs, improving the leak-off properties of the VAS gel as a fracturing fluid. The VAS gel, in turn, cleans the formation from oil residues in order to improve the anchoring of the RPM to the formation minerals.

A further synergistic effect attributed to the specific combination of this invention relates to duration of the treatment. While the VAS gel formed in the water pores could readily flow or move under higher pressures, such as found in a wellbore, the RPM anchored to the rock aids in preventing such movement, allowing the treatment to last longer. Additionally, the viscoelastic fluid breaks by dilution with formation water, so this anchoring process prevents intermixing within the rock pores.

The VAS gel that breaks in the oil containing pores in turn leaves the formation water wet favoring oil flow and anchored to the RPM of the fluid for future water control when the water level rises within the reservoir.

The combined gel of the present invention treats all four aspects of the fracture in an equal manner, regardless of heterogeneities, as a result of higher injection rates and pressures from fracturing in comparison with radial matrix treatments. Within a short period of time, the leak-off fluid begins to break in the oil pores and starts to receive a drag force in the water saturated pores, favoring the preferential propagation of the fracture within the oil producing zone.

Additional objects, features, and advantages will be apparent in the written description, which follows.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein. The components in the figures are not necessarily to scale, with the emphasis instead being placed upon clearly illustrating principles of the present invention.

DEFINITIONS

The following definitions are provided in order to aid those skilled in the art in understanding the detailed description of the present invention.

The term "amphoteric" refers to surfactants that have both positive and negative charges. The net charge of the surfactant can be positive, negative, or neutral, depending on the pH of the solution.

The term "anionic" refers to those viscoelastic surfactants that possess a net negative charge.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present invention include, but are not limited to, conventional proppants familiar to those skilled in the art such as sand, 20–40 mesh sand, resin-coated sand, sintered bauxite, glass beads, and similar materials.

The abbreviation "RPM" refers to relative permeability modifiers.

The term "surfactant" refers to a soluble, or partially soluble compound that reduces the surface tension of liquids, or reduces inter-facial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactants" or "VES" refers to that class of compounds which can form micelles (spherulitic, anisometric, lamellar, or liquid crystal) in the presence of counter ions in aqueous solutions, thereby imparting viscosity to the fluid. Anisometric micelles in particular are preferred, as their behavior in solution most closely resembles that of a polymer.

The abbreviation "VAS" refers to a Viscoelastic Anionic Surfactant, useful for fracturing operations and frac packing. As discussed herein, they have an anionic nature with preferred counterions of potassium, ammonium, sodium, calcium or magnesium.

DESCRIPTION OF THE INVENTION

One embodiment of the invention is directed towards a fluid for use as a well fracturing fluid, the fluid comprising a liquid carrier, a surfactant, and an amphoteric polymer.

The liquid carrier can generally be any liquid carrier suitable for use in oil and gas producing wells. A presently preferred liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt ($NaCO_3$, NaCl, KCl, etc.) has been added. The liquid carrier is preferably present in an amount of at least about 80% by weight. Specific examples of the amount of liquid carrier include 80%, 85%, 90%, and 95% by weight. The carrier liquid can be a VAS gel.

The pH of the fluid can generally be any pH compatible with downhole formations. The pH is presently preferred to be about 6.5 to about 10.0. The pH can be about the same as the formation pH.

The surfactant can generally be any surfactant. The surfactant is preferably viscoelastic. The surfactant is preferably anionic. The anionic surfactant can be an alkyl sarcosinate. The alkyl sarcosinate can generally have any number of carbon atoms. Presently preferred alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms.

The anionic surfactant can have the chemical formula $R_1CON(R_2)CH_2X$, wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The surfactant can generally be present in any weight percent concentration. Presently preferred concentrations of surfactant are about 0.1% to about 15% by weight. A presently more preferred concentration is about 0.5% to about 6% by weight. Laboratory procedures can be employed to determine the optimum concentrations for any particular situation.

The amphoteric polymer can generally be any amphoteric polymer. The amphoteric polymer can be a nonionic water-soluble homopolysaccharide or an anionic water-soluble polysaccharide. The polymer can generally have any molecular weight, and is presently preferred to have a molecular weight of at least about 500,000.

The polymer can be a hydrolyzed polyacrylamide polymer. The polymer can be a scleroglucan, a modified scleroglucan, or a scleroglucan modified by contact with glyoxal or glutaraldehyde. The scleroglucans are nonionic water-soluble homopolysaccharides, or water-soluble anionic polysaccharides, having molecular weights in excess of about 500,000, the molecules of which consist of a main straight chain formed of D-glucose units which are bonded by β-1,3-bonds and one in three of which is bonded to a side D-glucose unit by means of a β-1,6 bond. These polysaccharides can be obtained by any of the known methods in the art, such as fermentation of a medium based on sugar and inorganic salts under the action of a microorganism of Sclerotium type A. A more complete description of such scleroglucans and their preparations may be found, for example, in U.S. Pat. Nos. 3,301,848 and 4,561,985. In aqueous solutions, the scleroglucan chains are combined in a triple helix, which explains the rigidity of the biopolymer, and consequently its features of high viscosity-increasing power and resistance to shearing stress.

It is possible to use, as source of scleroglucan, the scleroglucan which is isolated from a fermentation medium, the product being in the form of a powder or of a more or less concentrated solution in an aqueous and/or aqueous-alcoholic solvent. Scleroglucans customarily used in applications in the petroleum field are also preferred according to the present invention, such as those which are white powders obtained by alcoholic precipitation of a fermentation broth in order to remove residues of the producing organism (mycelium, for example). Additionally, it is possible to use the liquid reaction mixture resulting from the fermentation and containing the scleroglucan in solution. According to the present invention, further suitable scleroglucans are the modified scleroglucan which result from the treatment of scleroglucans with a dialdehyde reagent (glyoxal, glutaraldehyde, and the like), as well as those described in U.S. Pat. No. 6,162,449 (β-1,3-scleroglucans with a cross-linked 3-dimensional structure produced by Sclerotium rolfsii).

The polymer can be Aquatrol V (a synthetic compound which reduces water production problems in well production; described in U.S. Pat. No. 5,465,792), AquaCon (a moderate molecular weight hydrophilic terpolymer based on polyacrylamide capable of binding to formation surfaces to enhance hydrocarbon production; described in U.S. Pat. No. 6,228,812) and Aquatrol C (an amphoteric polymeric material). Aquatrol V, Aquatrol C, and AquaCon are commercially available from BJ Services Company.

The polymer can be a terpolymer synthesized from an anionic monomer, a cationic monomer, and a neutral monomer. The monomers used preferably have similar reactivities so that the resultant amphoteric polymeric material has a random distribution of monomers. The anionic monomer can generally be any anionic monomer. Presently preferred anionic monomers include acrylic acid, methacrylic acid, 2-acrylamide-2-methylpropane sulfonic acid, and maleic anhydride. The cationic monomer can generally be any cationic monomer. Presently preferred cationic monomers include dimethyl-diallyl ammonium chloride, dimethylamino-ethyl methacrylate, and allyltrimethyl ammonium chloride. The neutral monomer can generally be any neutral monomer. Presently preferred neutral monomers include butadiene, N-vinyl-2-pyrrolidone, methyl vinyl ether, methyl acrylate, maleic anhydride, styrene, vinyl acetate, acrylamide, methyl methacrylate, and acrylonitrile. The polymer can be a terpolymer synthesized from acrylic acid (AA), dimethyl diallyl ammonium chloride (DMDAC), and acrylamide (AM). The ratio of monomers in the terpolymer can generally be any ratio. A presently preferred ratio is about 1:1: 1.

Another presently preferred amphoteric polymeric material (hereinafter "polymer 1") includes approximately 30% polymerized AA, 40% polymerized AM, and 10% polymerized DMDAC with approximately 20% free residual DMDAC which is not polymerized due to lower relative reactivity of the DMDAC monomer. The structural formula for a preferred amphoteric polymeric material is shown below:

The fluid can further comprise one or more additives. The fluid can further comprise a base. The fluid can further comprise a salt. The fluid can further comprise a buffer. The fluid can further comprise a relative permeability modifier. The fluid can further comprise methylethylamine, monoethanolamine, triethylamine, triethanolamine, sodium hydroxide, potassium hydroxide, potassium carbonate, sodium chloride, potassium chloride, potassium fluoride, $KH_2PO_4$, or $K_2HPO_4$. The fluid can further comprise a proppant. Conventional proppants will be familiar to those skilled in the art and include sand, resin coated sand sintered bauxite and similar materials. The proppant can be suspended in the fluid.

Relative permeability modifiers can be added to the fluids to fturther improve water shut off properties. These compounds are polymers that are water-soluble and improve the leak-off viscosity of the fracturing fluid.

Figure 1:
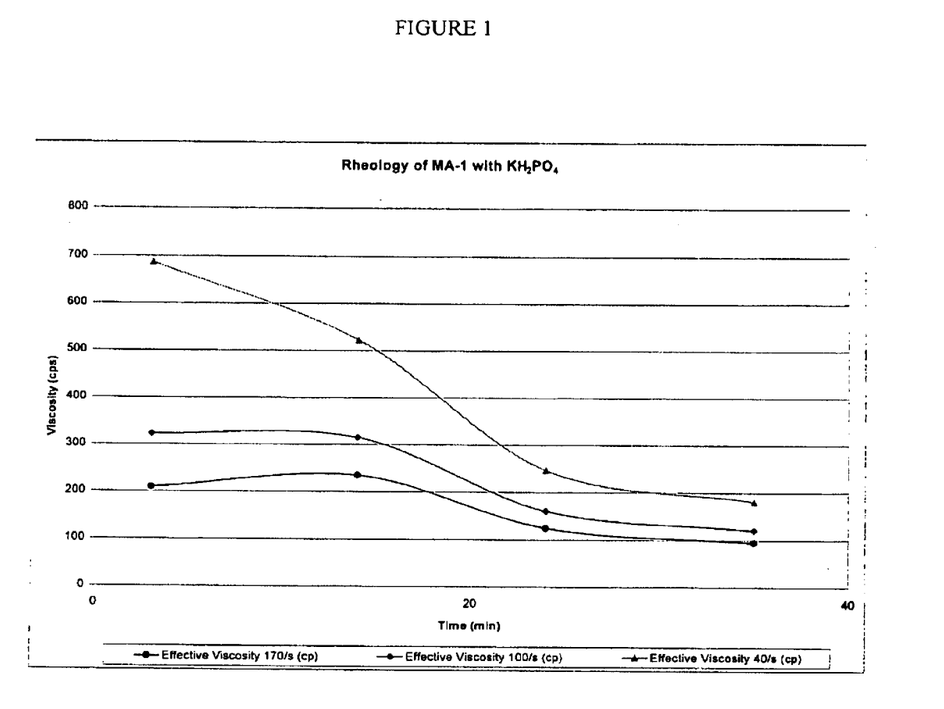
FIG. 1 describes the rheology of the Elastrafrac with a phosphate salt, indicating that the viscosity is exceptionally good for fracture creation and expansion. The fluid is shear thinning (viscosity drops as the shear rate increases) for low friction pressures and the fluid have $n'<0.6$ and $K'>0.01$ which is better than adequate for sand/proppant transport.
Figure 2:
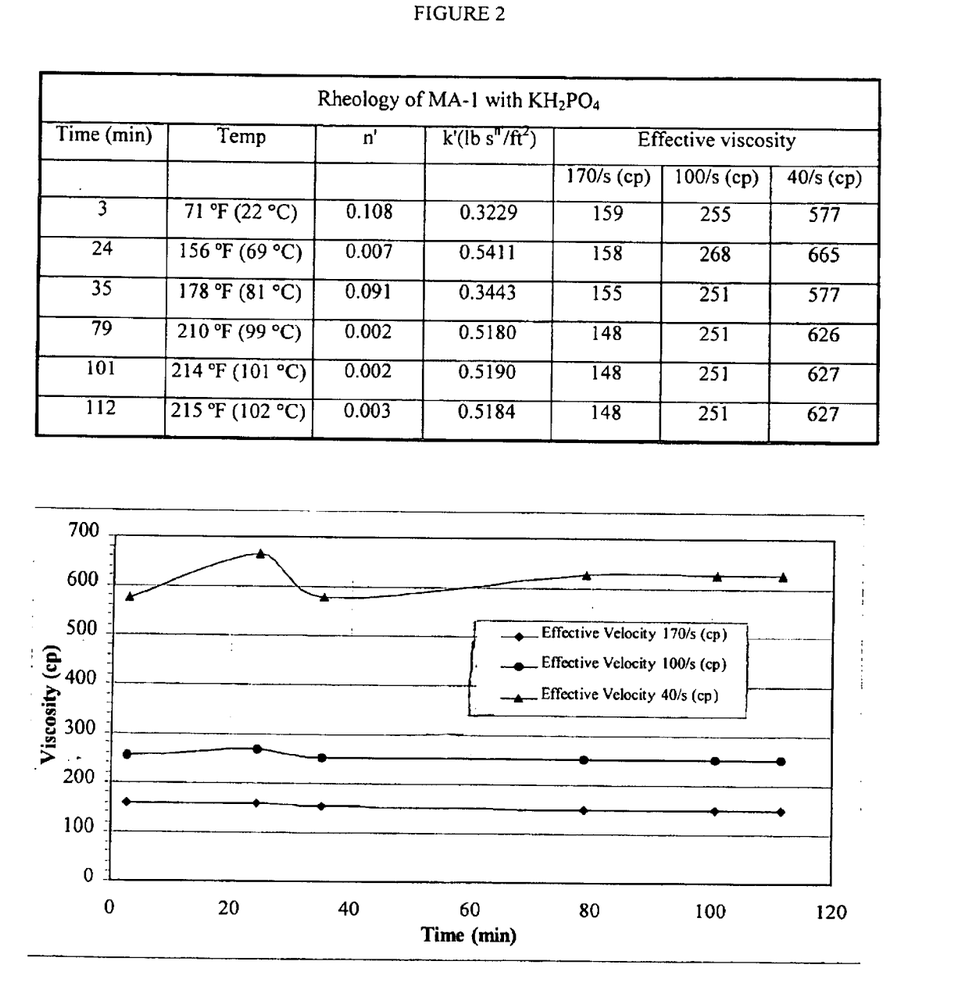
FIG. 2 describes the temperature and velocity of the shear rate using M-Aquatrol with a phosphate salt. Notice that the viscosity and its rheology are similar to the gel without the Aquatrol, and the fluid is viscoelastic and shear thinning with no detrimental effects to the gel by the addition of Aquatrol.
Figure 3:
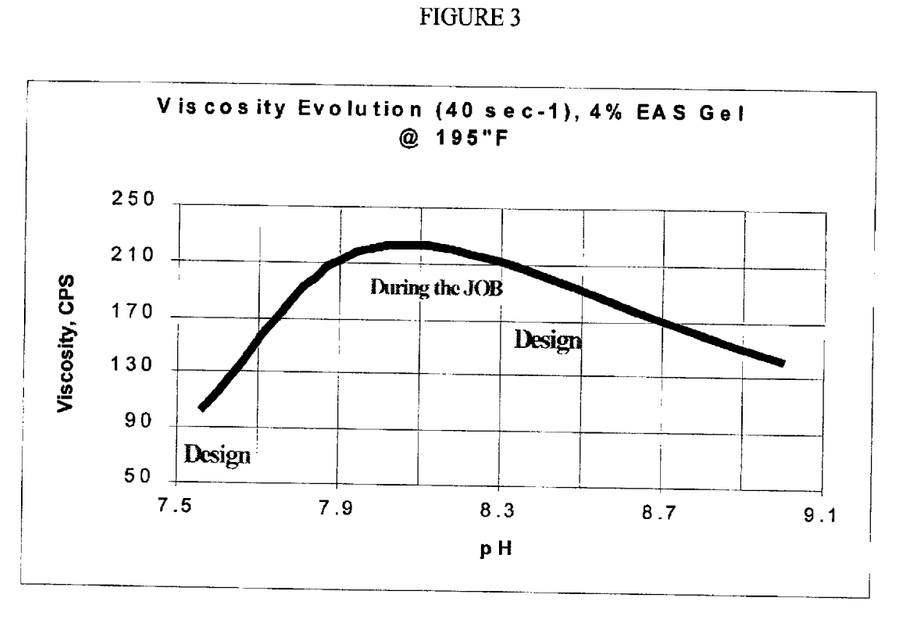
FIG. 3 describes the development of viscosity vs. pH and shows how the viscosity can be increased or reduced when the pH is adjusted to an optimum value (usually the formation pH).
Figure 4:
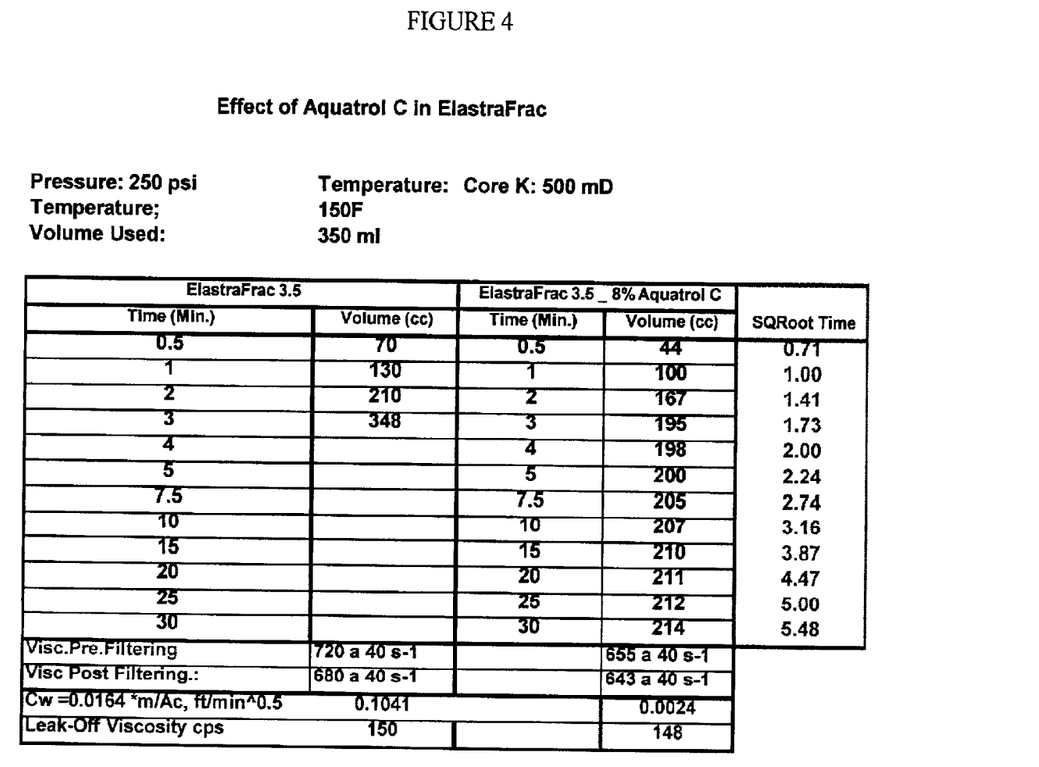
FIG. 4 shows a table that indicates the filtrate volumes vs. time for an Elastrafrac fluid with and without the addition of Aquatrol Concentrate. As can be seen, the fluid's viscosity with and without Aquatrol C, and pre- and post-filtering are similar, however the filtration efficiency measured by a calculated $C_w$ value (fluid-loss coefficient) is over 100 times better (i.e. smaller) for the ElastraFrac formulation containing Aquatrol.
Figure 5:
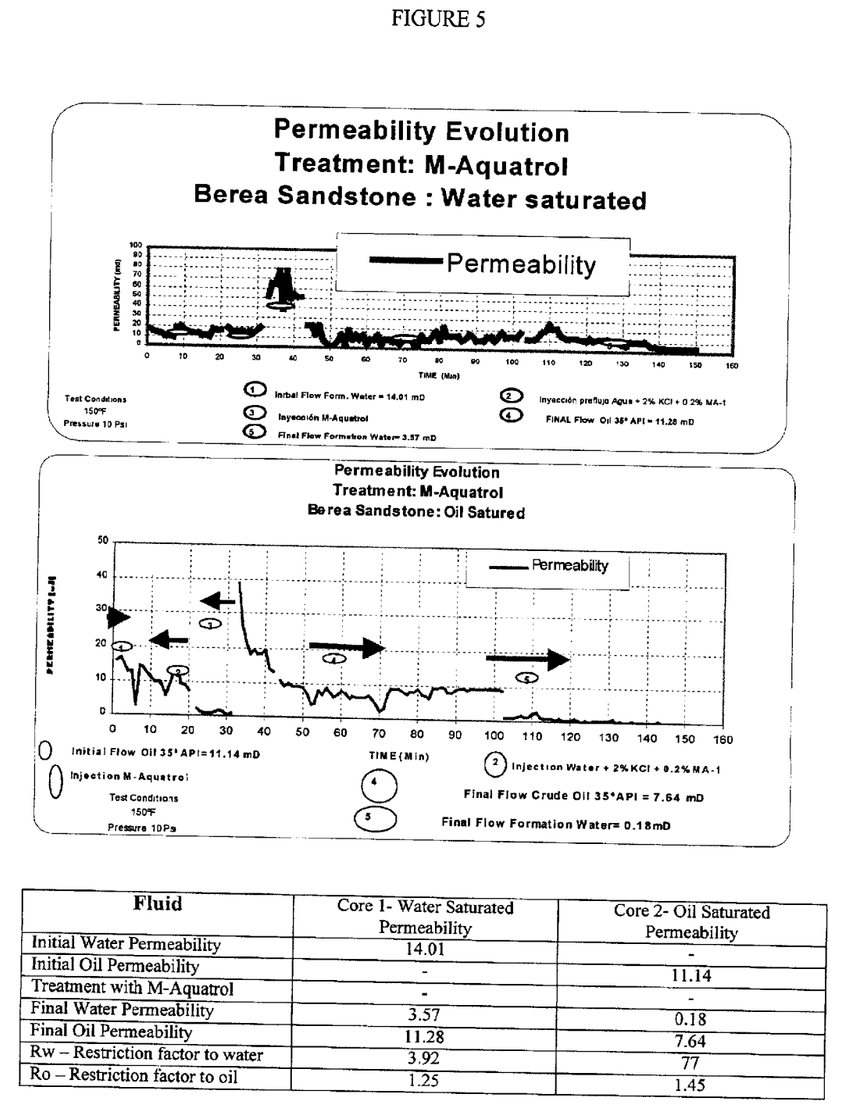
FIG. 5 contains two graphs and a table exhibiting the combined effect of controlling water without detrimental effects on oil permeability on a dual parallel core filtration test using M-Aquatrol.

A specific example of a treating fluid is as follows: (a) 11% KCl by weight; (b) 2.5% surfactant by weight; (c) 1.6% buffer (potassium carbonate in water (45% by weight potassium carbonate)) by volume, and (d) 1.0% of 10% (by weight) Polymer 1 solution. The rheology of this formulation is shown in Table 1 and FIGS. 1–2.

An additional embodiment of the invention involves the use of any of the above described fluids in a method of fracturing a subterranean formation. The method can comprise providing a fluid comprising a liquid carrier, a viscoelastic anionic surfactant, and an amphoteric polymer, pumping the fluid through a wellbore, and contacting the fluid and the subterranean formation to fracture the formation.

A further additional embodiment of the invention involves the use of any of the above described fluids in a method of reducing the amount of water produced from a subterranean oil producing formation. The method can comprise providing a fluid comprising a liquid carrier, a viscoelastic anionic surfactant, and an amphoteric polymer, pumping the fluid through a wellbore, contacting the fluid and the subterranean formation, and obtaining product from the formation. The weight percent of water in the product is less than the weight percent of water in product produced from a similar formation that was not contacted with the fluid. The fluid can further comprise a relative permeability modifier. The $C_w$ of the similar formation that was not treated with the fluid ("untreated $C_w$") is preferably greater than the $C_w$ of the formation treated with the fluid ("treated $C_w$"). The ratio of the untreated $C_w$ to the treated $C_w$ is preferably at least about 2, at least about 5, at least about 10, at least about 20, at least about 30, at least about 40, at least about 50, at least about 60, at least about 70, at least about 80, at least about 90, at least about 100, at least about 150, or at least about 200.

According to other embodiments of the invention, there is provided a fracturing fluid comprising anionic viscoelastic surfactants which viscosify and its leak-off viscosity can be enhanced while the fluid is injected in the pores of the rock, providing water shut off and favoring oil/gas flow and allowing non damaging polymers such as relative permeability modifiers to be included in the formulations without adversely affecting the gel viscosity but improving the gel filtration efficiency and its water control properties.

Some embodiments of the invention take advantage of the natural pH change at the formation rock to cause an increase in the gel viscosity at the formation pores to block water production, which is discussed herein. For example, in its use the fluid is designed for optimum viscosity at the same pH of the formation water/rock. However it is pumped at a pH that is lower or higher than the formation pH (0.3 to 1 unit) through a wellbore and into a surrounding formation having an aqueous zone and a hydrocarbon zone. The fluid is then allowed to contact the aqueous zone and the hydrocarbon zone. Contact with the hydrocarbon zone serves to thin the fluid since the surfactant gel is thinned by hydrocarbons. While contact with the water zone or water saturated pores will lower the gel pH to that of the formation increasing its viscoelasticity and viscosity. Additionally, if an RPM polymer is included in the formulation it will adhere to the water wet rock and induce a drag, or friction force on water, reinforcing the viscoelastic gel structure and also lubricating oil production, serving to preferentially block the flow of water from that portion of the formation. Consequently oil production is unaffected while water flow is preferentially shut off.

The amphoteric polymeric material is characterized by the presence of both positively and negatively charged components along the polymer chain. This nature of the polymeric material is believed to account for the polymeric material's ability to strongly bond to the formation while exhibiting a hydrophilic character capable of forming a strong hydrogen bond to water causing a drag or a higher friction pressure on water flowing through the capillaries or openings of the formation. By whatever mechanism, the mobility of formation water is greatly reduced by the amphoteric polymeric material without restricting the production of oil or gas to any. appreciable extent.

Additional description of various embodiments of the invention are provided below. The description with respect to "well-treating solution", and "viscous fluid" is applicable, with or without modifications, to the well service fluid in accordance with embodiments of the invention. It should be noted that any number disclosed herein should be understood as to mean an approximate value, regardless of whether the word "about" or "approximate" is used in describing the number.

A presently preferred well treating solution for changing the relative permeability of a formation to water can be prepared by adding the amphoteric polymeric material to VAS carrier liquid with the amphoteric polymeric material being present at about 1.0% to about 10% by volume, depending upon the permeability.

The resulting treating solution can be injected into the formation at pumping rates and treating pressures above the fracture gradient of the formation. The volume of treating solution used is based on the desired fracture geometry, the thickness of the zone to be treated, the porosity of the formation being treated, and other factors.

The viscous fluids of the invention can be used for transporting particulate through a conduit to a subterranean location. In one form, the fluids comprise an aqueous base, a surfactant comprising an alkyl sarcosinate having from about 12 to about 24 carbon atoms and a buffer for adjusting the pH of the combined aqueous base and surfactant at or for the formation pH. The alkyl sarcosinate is preferably present at about 0.5% to about 10% by weight, based upon the weight of the total fluid. The pH of the viscous fluid is preferably adjusted with the buffer to about 6.5 to about 10.0 for most formations.

The viscous fluids of the invention can also include an additional source of anions in addition to those furnished by the surfactant. The additional source of anions can be a co-surfactant such as any ionic or anionic undiluted surfactant.

In the method of fracturing a subterranean formation of the invention, an aqueous base fluid is combined with a surfactant comprising an alkyl sarcosinate having from about 12 to about 24 carbon atoms. The combined fluid is buffered to thereby adjust the pH of the combined aqueous base and surfactant at or for the formation pH, thereby creating a viscous fluid capable of supporting proppant. The viscous fluid is pumped through a wellbore and into a surrounding formation at a pressure sufficient to fracture the formation.

The viscous fluids of the invention can also be used in a method for reducing the amount of water produced from a subterranean oil producing formation. An aqueous base fluid is combined with a surfactant comprising an alkyl sarcosinate having from about 12 to about 24 carbon atoms. The combined fluid is buffered to thereby adjust the pH of the combined aqueous base and surfactant sufficiently to produce a viscous fluid. The viscous fluid is pumped through a wellbore and into a surrounding formation having an aqueous zone and a hydrocarbon zone, the aqueous zone comprising water. The viscous fluid is then allowed to contact the aqueous zone and the hydrocarbon zone. Contact with the hydrocarbon zone serves to thin the viscous fluid while contact with the aqueous zone serves to preferentially block the flow of water from that portion of the formation.

The viscoelastic surfactant fluid is useful as a fracturing fluid with improved efficiency. Specifically, the use of this fluid in fracturing a formation will simultaneously enhance oil production while simultaneously drastically minimizing or completely stopping water production.

In a preferred form, the viscous fluids of the invention comprise water, a base, a surfactant comprising an alkyl sarcosinate having from about 12 to about 24 carbon atoms in the alkyl group, and a buffer for adjusting the pH, of the combined aqueous base and surfactant at or for the formation pH. As will be explained in detail, the fluids of the invention can be optimized for viscosity and for the formation pH in order to reduce ion exchange at the formation, thereby avoiding clay dispersion and swelling. The water used in formulating the fluids can be fresh water or light brines from any convenient source. The particularly preferred alkyl sarcosinates used as the surfactant have an alkyl group of about 14 to about 18 carbon atoms.

Sarcosine (N-methylglycine) is a naturally occurring amino acid found in starfish, sea urchins and crustaceans. It can be purchased from a variety of commercial sources, or alternately produced by a number of synthetic routes known in the art including thermal decomposition of caffeine in the presence of barium hydroxide (*Arch. Pharm.* 232: 601, 1894); (*Bull. Chem. Soc. Japan*, 39: 2535, 1966); and numerous others (T. Shirai in Synthetic Production and Utilization of Amino Acids; T. Kaneko, et al., Eds.; Wiley, New York: pp. 184–186, 1974). Sodium sarcosinate is manufactured commercially from formaldehyde, sodium cyanide and methyl amine (U.S. Pat. Nos. 2,720,540 and 3,009,954). The preferred sarcosinate are the condensation products of sodium sarcosinate and a fatty acid chloride. The fatty acid chloride is reacted with sodium sarcosinate under carefully controlled alkaline conditions (i.e. the Schotten-Bauman reaction) to produce the fatty sarcosinate sodium salt which is water soluble. Upon acidification, the fatty sarcosine acid, which is also water insoluble, is formed and may be isolated from the reaction medium. The acyl sarcosines may be neutralized with bases such as the salts of sodium, potassium, ammonia, or organic bases such as triethanolamine in order to produce aqueous solutions. The preferred sarcosinates of the invention can be represented structurally as:

wherein $R_1$ is a hydrophobic moiety of alkyl, alkenyl, alkylarylalkyl, alkoxyalkyl, and the like, wherein alkyl and alkenyl represent groups that contain about 12 to about 24 carbon atoms which may be branched or straight chained. Representative long chain alkyl groups include, but are not limited to, tetradecyl, hexadecyl, octadecentyl (oleyl), octadecyl (stearyl), and docosenoic functionalities. $R_2$ is hydrogen, methyl, propyl, butyl, or ethyl. X is carboxyl or sulfonyl.

One particular surfactant selected for use in the method of the invention is an anionic sarcosinate surfactant available commercially from BJ Services Company as "M-Aquatrol" (MA). The MA-1 sarcosinate is a viscous liquid surfactant with at least 94% oleoyl sarcosine. For hydraulic fracturing, a sufficient quantity of the sarcosinate is present in aqueous solution to provide sufficient viscosity to suspend proppant during placement. The surfactant is preferably present at about 0.5% to about 10% by weight, most preferably at about 0.5% to about 6% by weight, based upon the weight of the total fluid. Laboratory procedures can be employed to determine the optimum concentrations for any particular job.

The surfacant can be added to an aqueous solution in which there is typically dissolved a quantity of at least one water soluble salt to effect formation stability. Typical water-soluble salts include potassium chloride, sodium chloride and the like. Formation stability is typically achieved with only small concentrations of salt. The water-soluble salts may be considered part of the "buffer" for adjusting the pH of the combined aqueous base and surfactant in the method of the present invention. The viscosity of the fluids of the invention are improved significantly by the addition of certain additional anions to the surfactant-laden solution. The pH can be adjusted, for example, by the addition of alkali metal, carbonate, phosphate or borate, or organic amines, especially alkanol amines such as mono-, di- or triethanolamine.

High temperature stability of the fluids in question is achieved if selecting specific anion, such as phosphate or fluoride ions instead of chlorides, preferably provided in the form of an inorganic phosphate or fluoride salt or a fluoride acid such as fluosilicic acid ($H_2SiF_6$). The fluoride salt concentration can be about 0.5% to about 10% by weight, and more preferably about 3% to about 7% by weight, based upon the total weight of the fluid. Typical fluoride salts include ammonium bifluoride and potassium fluoride. The pH of the surfactant-fluoride salt solution can be adjusted to about 6.5 to about 10. The pH can be adjusted with the same bases as discussed above.

Each salt will produce a peak viscosity at a different pH. The fluids of invention are optimized for viscosity and formation pH as will be discussed with respect to the laboratory analyses which follow.

In the method of fracturing a formation using the formulations of the invention, an aqueous base fluid is combined with an anionic surfactant comprising an alkyl sarcosinate having from about 12 to about 24 carbon atoms, and alternatively a viscoelastic polymer such as an RPM. Standard mixing procedures known in the art can be employed since heating of the solution or special agitation procedures are not normally required. The aqueous base has been buffered with a buffer to thereby adjust the pH of the combined aqueous base and surfactant above about 6.5, thereby creating a viscous fluid capable of supporting proppant. The proppant can be added and the viscous fluid can then be pumped through a wellbore and into a surrounding formation at a pressure sufficient to fracture the formation. Typically, the viscous fluid can be allowed to contact the formation for a period of tine sufficient to increase the viscosity in the water saturated pores, while in the oil pores it will thin immediately and therefore no breakers are required.

These effects cannot be easily achieved when cationic surfactants are used. Due to the fact that cationic surfactants are not pH dependent with regards to viscosity, their viscosity remains within a narrow, unadjustable range, thereby limiting their utility. The anionic surfactants of the present invention overcome this problem by being pH dependent with regards to viscosity, thereby allowing for their viscosity to be adjusted to the desired value by altering the pH appropriately.

The fluid of the present invention may also be used as asphaltene-dispersing agents. Asphaltenes are constituents of crude oils, usually present as colloidal dispersions stabilized by resins in the oil. While examples of asphaltene-dispersing agents are know in the art (e.g. U.S. Pat. No. 5,948,237), the sarcosinate anionic surfactant of the invention in combination with RPM type materials produces a synergistic effect in this regard. Specifically, these compounds in combination form an excellent asphaltene-dispersant, thereby aiding in the cleaning of rocks, pipes, valves, conveying devices, and the like by removing heavy oil deposits and asphaltenes themselves.

The fluids of the invention can also be used as selective water control additives. The viscous fluids can be pumped into a water rich sector of a producing interval. Once placed, the gel viscosity will prevent formation water flow through that portion of the reservoir. On the other hand, gel pumped into the oil rich sector of the formation reservoir will immediately thin on contact with the oil contained within the reservoir. Consequently, oil production will be uninhibited while water flow will be preferentially stopped or significantly reduced.

For fracturing applications, the fluids of the invention are typically pumped downhole at or slightly above the formation pH. Preferably, when the fluids of the invention are used for water control purposes, the fluids are pumped downhole at about 3/10 of a pH unit less or more than the formation material pH depending on the anion portion of the salt used as counter cation. The fluid is thus pumped in a thinned state, reducing the friction pressure of the pumping job. Upon contacting the formation material, the pH of the fluid increases, resulting in complete gellation of the fluid at the formation location rather than at the well surface.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

General methods

Each of the components of the viscous fluids of the invention is readily soluble in water or light brines at pH higher than 4.5. The fluid is easily prepared in mixing equipment that allows circulation or agitation, i.e. blenders, tanks equipped with augers or tanks that are connected to a circulating pump, such as an acid transport trailer or in displacement tanks of cementing units.

A preferred mixing procedure is as follows.

1) Load the fresh water necessary to prepare the desired volume of viscous fluid a clean tank.

2) while agitating or circulating, slowly add and dissolve the required amount of the salt, for example, KCl, KF, $KH_2PO_4$ and/or $K_2HPO_4$.

The salt concentration will depend on the type of salt used and the final pH, as part of the "additional cations requirement for optimum viscosity as discussed above. The following table can be used as a guideline. Unless otherwise stated, the percentages are by weight of total fluid solution.

| Salt Type | Preferred Concentration for Visco Fluid | More Preferred Concentration for Visco Fluid | Preferred pH |
|---|---|---|---|
| KCl | ≧6% | 11–12% | 7.3–8.5 |
| NH₄Cl | ≧2% | 3–5% | 7–8.5 |
| KF | ≧5% | 6.5–8% | 8–10 |
| ABF | ≧1.5% | 2.5-3% | 8–9.5 |

3. Add the required volume of pH adjuster/buffer solution.

4. Add the MA-1 and mix slowly mix (to avoid foam) for 5–10 minutes or until it disperses well to produce a uniform linear gel.

5. Add the remainder of the buffer for completed activation and full viscosity development.

In the case of KF, the anionic surfactant is supplied in the acid form is not soluble in field water. The pH of the water in the mixing tank must be alkaline enough before the addition of MA-1, so that when the MA-1 is added, the pH is at least above 4.5 and preferentially above 7.0. This buffering of the mixing water will prevent waxing out of the surfactant and speeds the mixing process. Usually with field water, the addition of 40% solution of base such as KOH at one-half of the concentration of MA-1 will neutralize the pH of the mixing water when the MA-1 is added.

The tables below are examples of the viscosity optimization process using 4% MA-1 (sarcosinate surfactant) for a target formation pH of 8.0 using KCl and KF with field water. The BF-7L is a commercially available buffer commonly used in the formulation of fracturing fluids which allows adjustment of pH levels in fracturing gels to about 8.5 to about 9.75, thereby preventing the fall in pH that occurs as fluid temperatures increase. BF-7L is commercially available from BJ Services.

Example 2

Fluids Containing Potassium Chloride

Formation pH: 8.0 at 1800° F. (82° C.); design for a pH of 8.5 to 9.0 at the well surface. Fluid viscosity requirements =200 cps at 180° F. (82° C.) and 40 sec.

| | For KCl determination: | | |
|---|---|---|---|
| 4% MA-1 + 2% BF-7L | KCl % by weight | pH gel at 80° F. 27° C.) + 0.4% EF-7L | Viscosity at 40 sec and 80° F. (27° C.), CPS |
| 4% MA-1 + 2.0% BF-7L | 10 | 8.5 | 1281 |
| 4% MA-1 + 2.0% BF-7L | 11 | 8.6 | 1565 |
| 4% MA-1 + 2.0% BF-7L | 12 | 8.6 | 1708 |
| 4% MA-1 + 2.0% BF-7L | 13 | 8.7 | 1512 |

The 12% KCl systems produced 285 cps at 40 sec$^{-1}$ and a pH of 8.2 when tested at 180° F. (82° C.), therefore a system with 3.5 MA-1 may be sufficient for this treatment.

Example 3

Fluids Containing Potassium Fluoride

Formation pH: 8 at 180° F. (82° C.); design for 8.5 to 9.0 at the well surface. Fluid viscosity requirements =200 Cps at 40 sec.

| 4% MA-1 + 2% BF-7L | KCl % by weight | pH gel at 80° F. + 0.4% EF-7L | Viscosity at 40 sec and 80° F. CPS |
|---|---|---|---|
| 4% MA-1 + 2.0% BF-7L | 7 | 8.91 | 1424 |
| 4% MA-1 + 2.0% BF-7L | 8 | 8.95 | 2277 |
| 4% MA-1 + 2.0% BF-7L | 9 | 8.96 | 996 |

For KF determination

The 8% KF system produced 452 cps at 40 sec$^{-1}$ and a pH of 8.6 when tested at 180° .F (82° C.), therefore a system with 3% MA-1 may be sufficient for this treatment.

As indicated in the above examples, the formulations utilizing KF produce about twice the viscosity of similar formulations that contain KCl. However, KF is not available in all geographic locations. The formulations may use a combination of ammnonium bifluoride ($NH_4HF_2$, ABF) and potassium hydroxide in order to produce KF in solution. Because the formulations are mixing cations (potassium and ammonium), it is more difficult to optimize the viscosity and pH.

Example 4

Field Mixing Surfactant Solutions

Each component of the surfactant fluid is readily soluble in water or light brines at pH higher than 4.5. The fluid is easily prepared in mixing equipment that allow circulation or agitation, i.e. blenders, tanks equipped with augers or tanks that are connected to a circulating pump, such as an acid transport trailer or in displacement tanks of cementing units. The following procedures can be used to prepare a fluid of the present invention.

1. Load the fresh water necessary to prepare the desired volume of fluid into a clean tank.
2. While agitating or circulating, slowly add and dissolve the required amount of the salt; see Note 1 below.
3. Add the required volume of pH adjuster/buffer solution; see Note 2 below.
4. Add the surfactant and mix slowly mix (to avoid foam) for 5–10 minutes or until it disperses well to produce a uniform linear gel.
5. Add the correct concentration of buffer for either 1) complete activation and full viscosity development or 2) for partial activation and low viscosity development in some water control applications; see Note 3 below.
6. Add the required volume or weight of polymer; see note 4 below.

Note 1: The salt concentration will depend on the type of salt used and the final pH, as part of the counter cation requirements for optimum viscosity is provided by the pH adjuster/buffer system used. The following table can be used as a guideline.

| Salt Type | Preferred Concentration for Viscoelasticity | More Preferred Concentration for Viscoelasticity | Preferred pH |
|---|---|---|---|
| KCl | ≧6% | 11–12% | 7.3–8.5 |
| KF | ≧5% | 6.5–8% | 8–10 |
| $KH_2PO_4$ | ≧10% | 12–15% | 6.6–9 |
| $K_2HPO_4$ | ≧14% | 15–19% | 7–9.5 |

Note 2: The surfactants are commercially available in acid and salt form. The surfactant in the acid form is not soluble in water, and therefore the pH of the water in the tank preferably is sufficiently alkaline (adjusting accordingly) before the addition of surfactant so that when the surfactant is added, the pH is at least above 4.5 and preferentially 7. In this manner, waxing out (i.e. exceeding the solubility) of the surfactant (which can lead to significantly longer mixing times) will be reduced or eliminated.

Note 3: The fluids are preferably pumped downhole at about 0.3 to about 1 pH unit more or less than the formation water pH, depending upon the salt used in the formulation as KCl salt produce higher viscosity with lower pH while the other salts produce higher viscosities with higher pHs. The fluid is thus pumped in a thinner state, reducing the friction pressure of the pumping job. Upon contacting the formation, the pH of the fluid adjusts to the formation rock pHs, resulting in complete gellation of the fluid at the formation rather than at the well surface or in the fracture. The preferred pH adjusters or buffers are functional buffers or potassium base additives for improved viscosity. However, other cation base alkaline materials could also be used such as NaOH or $Na_2CO_3$, as well as organic basis such as methylethylamine, monoethanolamine, and triethylamine.

Note 4: Depending upon the RPM polymer used, the pH of the solution may be altered. This needs to be preferentially added prior to the addition of the buffer. Additionally, the polymer added may be in either solid or liquid form.

An invention has been provided with several advantages. The fluids described herein have the ability to add more control to a fracture, specifically controlling the water while increasing the efficiency of the frac fluid. The fluids of the invention have the ability to suspend proppant for hydraulic fracturing operations and yet possess superior clean-up possibilities. The fluids can also be used for gravel pack jobs, filter cake removal, sand or proppant clean jobs, for water control purposes and for other applications. The fluids are economical to produce and offer superior properties as compared to existing products available in the market. The fluids are more temperature tolerant than previously available surfactant based systems. The KCl systems described above can generally be used for temperatures up to about 230° F. (110° C.) with the KF or phosphate systems being useful up to about 260° F. (127° C.). The fluids also exhibit reduced friction pressures during pumping.

All of the processes disclosed and claimed herein can be made and executed without undue experimentation in light of the present disclosure. While the compositions and methods of this invention have been described in terms of preferred embodiments, and in a limited number of forms, it will be apparent to those of skill in the art that variations may be applied to the processes and in the steps or in the sequence of steps of the methods described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention.

What is claimed is:

1. A fluid for use as a well fracturing fluid, the fluid comprising a liquid carrier, a viscoelastic anionic surfactant, and an amphoteric polymer.

2. The fluid of claim 1, wherein the liquid carrier is water.

3. The fluid of claim 1, wherein the liquid carrier is present in an amount of at least about 80% by weight.

4. The fluid of claim 1, having a pH of about 6.5 to about 10.0.

5. The fluid of claim 1, wherein the anionic surfactant is an alkyl sarcosinate.

6. The fluid of claim 1, wherein the anionic surfactant is an alkyl sarcosinate having about 12 to about 24 carbon atoms.

7. The fluid of claim 1, wherein the anionic surfactant is an alkyl sarcosinate having about 14 to about 18 carbon atoms.

8. The fluid of claim 1, wherein the anionic surfactant has the chemical formula:

wherein:
  $R_1$ is a hydrophobic chain having about 12 to about 24 carbon atoms;
  $R_2$ is hydrogen, methyl, ethyl, propyl, or butyl; and
  X is carboxyl or sulfonyl.

9. The fluid of claim 8, wherein the hydrophobic chain is an alkyl group, an alkenyl group, an alkylarylalkyl group, or an alkoxyalkyl group.

10. The fluid of claim 8, wherein the hydrophobic chain is a tetradecyl group, a hexadecyl group, an octadecentyl group, an octadecyl group, or a docosenoic group.

11. The fluid of claim 1, wherein the anionic surfactant is present in an amount of about 0.1% to about 15% by weight.

12. The fluid of claim 1, wherein the anionic surfactant is present in an amount of about 0.5% to about 6% by weight.

13. The fluid of claim 1, wherein the amphoteric polymer is a water-soluble homopolysaccharide or an anionic water-soluble polysaccharide.

14. The fluid of claim 1, wherein the amphoteric polymer has a molecular weight of at least about 500,000.

15. The fluid of claim 1, wherein the amphoteric polymer is a scleroglucan.

16. The fluid of claim 1, wherein the amphoteric polymer is a modified scleroglucan.

17. The fluid of claim 1, wherein the amphoteric polymer is a hydrolyzed polyacrylamide.

18. The fluid of claim 1, wherein the amphoteric polymer is a terpolymer synthesized from an anionic monomer, a cationic monomer, and a neutral monomer.

19. The fluid of claim 18, wherein the anionic monomer is acrylic acid, methacrylic acid, or 2-acrylamide-2-methylpropane sulfonic acid.

20. The fluid of claim 18, wherein the cationic monomer is dimethyl-diallyl ammonium chloride, dimethylaminoethyl methacrylate, or allyltrimethyl ammonium chloride.

21. The fluid of claim 18, wherein the neutral monomer is butadiene, N-vinyl-2-pyrrolidone, methyl vinyl ether, methyl acrylate, maleic anhydride, styrene, vinyl acetate, acrylamide, methyl methacrylate, or acrylonitrile.

22. The fluid of claim 18, wherein:
  the anionic monomer is acrylic acid;
  the cationic monomer is dimethyl diallyl ammonium chloride; and
  the neutral monomer is acrylamide.

23. The fluid of claim 1, further comprising a base.

24. The fluid of claim 1, further comprising a salt.

25. The fluid of claim 1, further comprising a buffer.

26. The fluid of claim 1, further comprising methylethylamine, monoethanolamine, triethylamine, triethanolamine, sodium hydroxide, potassium hydroxide, potassium carbonate, sodium chloride, potassium chloride, potassium fluoride, $KH_2PO_4$, or $K_2HPO_4$.

27. The fluid of claim 1, further comprising a relative permeability modifier.

28. The fluid of claim 1, further comprising a proppant.

* * * * *